United States Patent Office 3,806,370
Patented Apr. 23, 1974

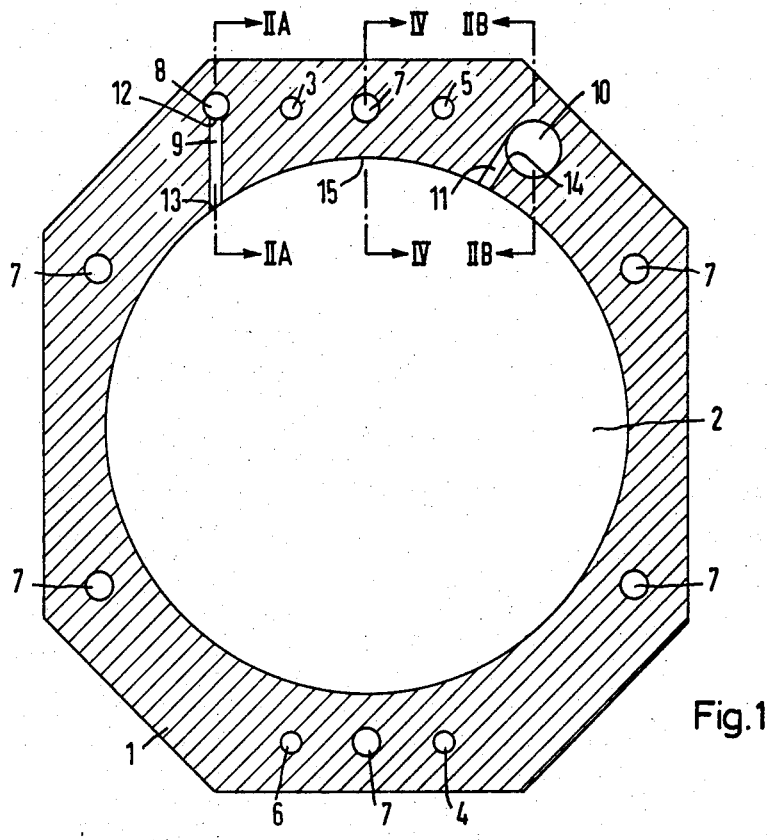
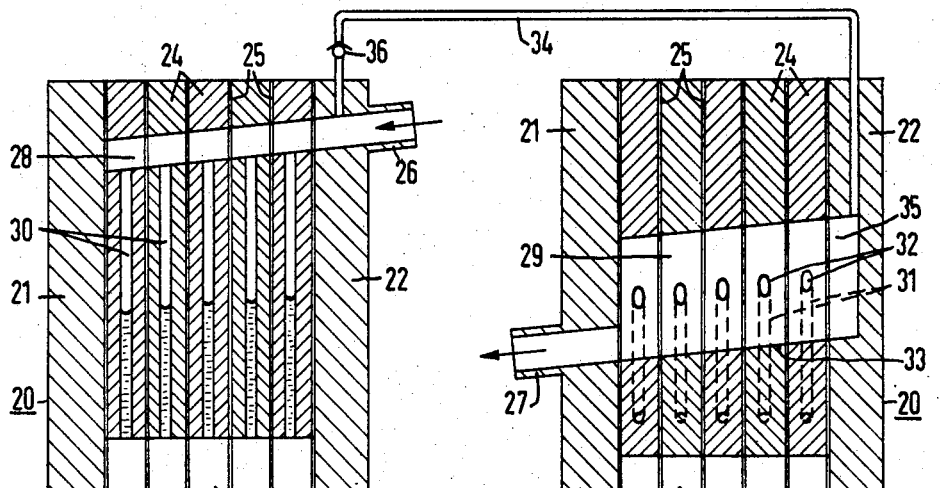
Fig. 1
Fig. 2a   Fig. 2b

3,806,370
FUEL CELL BATTERY WITH INTERMITTENT FLUSHING OF THE ELECTROLYTE
Herbert Nischik, Erlangen, Germany, assignor to Siemens Aktiengesellschaft, Munchen, Germany
Filed Sept. 15, 1972, Ser. No. 289,544
Claims priority, application Germany, Sept. 20, 1971, P 21 46 974.9
Int. Cl. H01m 27/12
U.S. Cl. 136—86 R                     16 Claims

ABSTRACT OF THE DISCLOSURE

An electrolyte interrupter system for providing intermittent flushing of the electrolyte in a fuel cell battery having several fuel cells in which the electrodes are held in plastic frames. The electrolyte interrupter system is constituted by an electrolyte distributor and an electrolyte manifold arranged in the frames of the individual fuel cells. Electrolyte supply ducts for the individual fuel cells open into the electrolyte distributor, and electrolyte discharge ducts for the individual fuel cells open into the electrolyte manifold. The electrolyte distributor and the electrolyte manifold are each formed by mutually aligned holes in the upper portion of the frames, with the bottom of the holes forming the electrolyte distributor being located at least at the same height as the openings of the electrolyte discharge ducts leading into the electrolyte manifold.

BACKGROUND OF THE INVENTION

Field of the invention

The present invention relates to a fuel cell battery consisting of several fuel cells, the electrodes of which are held in plastic frames, and more particularly relates to an electrolyte interrupter system for such fuel cell battery consistinn of an electrolyte distributor and an electrolyte manifold which provide intermittent flushing of the electrolyte.

DESCRIPTION OF THE PRIOR ART

In the known fuel cell batteries consisting of seevral electrically series-connected fuel cell elements, the electrolyte is usually supplied in such a manner that the electrolytic liquid flows through the individual fuel cells in parallel. For supplying all individual fuel cells uniformly and for the purpose of equilizing the concentration, the electrolytic liquid may be circulated. Here, the fuel cell battery, an electrolyte supply tank and a pump are arranged in a closed electrolyte cycle. In such an arrangement where the electrolyte spaces of all fuel cells of the battery are disposed in parallel with each other in a closed cycle, the individual fuel cells are connected with each other via the electrolytic liquid. These electrolyte connections are known to cause short-circuit currents commonly referred to as leakage currents. The leakage currents are in the order of 0.5 to 1.0 ampere for batteries of conventional design. These leakage currents reduce the efficiency of the batteries considerably. Leakage currents of the order of magnitude mentioned are not tolerable if the anticipated load currents are also of this order of magnitude, i.e., if the batteries are to be operated with low to medium current densities. The same rule applies particularly to fuel cell batteries which are provided as emergency units which stand without load in ready condition for long periods of time, in which case already a small short-circuit current is equivalent to a large loss. The same rule also applies to fuel cell batteries which are to be operated with small loads unattended for extended periods.

Various methods and devices have already become known for reducing, or interrupting, respectively, the electrolyte short-circuit currents in fuel cell batteries. In U.S. Pat. 3,522,098 there is disclosed the periodic injection of gas into the electrolyte of fuel cell batteries prior to its entrance into the fuel cells, for the purpose of reducing electrolyte short-circuit currents so that gas bubbles are formed. The cross section of the electrolyte filaments at the point of the bubbles is thereby reduced and the electric resistance is increased.

In U.S. Pat. 3,524,769, there is disclosed a method and a device for interrupting the short circuit current in batteries consisting of at least two, electrically series-connected fuel cells through which the electrolyte flows in parallel. In this known method, an electrolyte interrupter system, consisting of an electrolyte distributor and an electrolyte manifold, is arranged above the fuel cell battery. A leveling tank is arranged above the interrupter system and is connected with the electrolyte distributor. The electrolyte distributor is subdivided by partitions into separator chambers, each of which is separately connected with the electrolyte space or chamber of a full cell of the battery. The electrolyte spaces are furthermore connected with the electrolyte manifold, and the electrolyte manifold is connected with an electrolyte supply tank. The method includes an intermitent flushing of the electrolyte of the fuel cell battery. While the electrolyte spaces are always filled with electrolytic liquid, the electrolyte distributor and the lines from the electrolyte spaces to the electrolyte manifold are filled with electrolytic liquid during the quiescent phase only to such an extent that the short-circuit currents due to electrolyte connections can occur neither in the distributor nor in the manifold. During the flushing phase, the electrolyte is pumped from the supply tank into the leveling tank, from which it is led into the distribtuor intermittently. The electrolyte arrives separately via the separator chambers of the distributor at the electrolyte space of each individual fuel cell. After flowing through the electrolyte spaces of the battery, the electrolyte is returned to the supply tank via the manifold, in which process the electrolyte connections established between the individual fuel cells in the distributor and the manifold during the flushing operation are broken after the termination of the electrolyte circulation by the discharge of the electrolyte into the supply tank.

The above-described type of electrolyte flushing, i.e., the use of an electrolyte distributor and an electrolyte manifold for preventing internal short-circuit currents in fuel cell batteries is also described in the journal, "Chemie-Ingenieur-Technik," 41, No. 4, p. 146 to 154 (1969). This method has been well accepted in practical operation. For example, it is known that a fuel cell battery equipped in this manner has operated over a period of almost four years without the occurence of disturbances caused by electrolyte short-circut currents.

However, it can be noted that such fuel cell batteries are disadvantageous in that the entire system can assume a somewhat bulky shape due to the arrangement of the electrolyte distributor and the electrolyte manifold, whereby a compact design becomes difficult. This may have an undesirable effect if such batteries are used as emergency power supply units. A disadvantage can result from the fact that the thermal insulation of the fuel cell battery with its bulk arrangement can become a problem. Good thermal insulation against low ambient temperatures is necessary, particularly if the battery is to be used as a line-independent power supply over extended periods of time under operating conditions with little or no attendance, for example, for television translators, meteorological stations, relay stations and other unattended signal stations.

SUMMARY OF THE INVENTION

It is an object of the invention to further improve a fuel cell battery consisting of several fuel cells, the electrodes of which are held in plastic frames, with intermittent flushing of the electrolyte by means of an electrolyte interrupter system consisting of an electrolyte distributor and an electrolyte manifold. It is another object to provide a compact design for such a multi-celled fuel cell battery. It is a further object to provide good thermal insulation in such a multi-celled fuel cell battery.

These and other objects are achieved by the present invention which provides an electrolyte interrupter system for a fuel cell battery having several fuel cells in which the electrodes are held in plastic frames. The electrolyte interrupter system provides intermittent flushing of the electrolyte and is constituted by an electrolyte distributor and an electrolyte manifold arranged in the frames of the individual fuel cells. Electrolyte supply ducts for the individual fuel cells open into the electrolyte distributor, and electrolyte discharge ducts for the individual fuel cells open into the electrolyte manifold. The electrolyte distributor and the electrolyte manifold are each formed by mutually aligned holes in the upper portion of the fuel cell frames, with the bottom of the holes forming the electrolyte distributor being located at least at the same height as the openings of the electrolyte discharge into the electrolyte manifold.

The fuel cell battery according to the present invention offers many advantages. Through the arrangement of the electrolyte interrupter system consisting of an electrolyte distributor and an electrolyte manifold in the cell frames of the fuel cells, a simple and compact design of the battery and the entire system is achieved. The volume of the system is considerably reduced thereby and the production costs can be reduced substantially. In addition, the simple and compact design of the battery makes excellent thermal insulation possible.

The intermittent flushing of the electrolyte, which is used in the fuel cell battery according to the invention, is attended by further advantages in addition to the reduction or interruption, respectively, of the electrolyte leakage currents. Because of the lower electrolyte leakage currents, an increased utilization of the reaction process is obtained, i.e., greater efficiency of the conversion of chemical energy to electric energy. Moreover, the intermittent flushing causes a reduction of the concentration polarization of the electrodes, which results in higher voltage efficiency. Finally, the intermittent flushing of the electrolyte causes the elimination of gas bubbles from the electrolyte spaces and the removal of gas cushions from the active areas of the electrodes.

In the fuel cell battery according to the invention it is advantageous to arrange the electrolyte distributor at a higher level than the electrolyte manifold. In this fashion, there is achieved in a simple manner a condition whereby the electrolyte distributor is completely free of electrolytic liquid after the completion of the flushing process.

BRIEF DESCRIPTION OF THE DRAWINGS

FIG. 1 shows an individual cell of a preferred embodiment of the fuel cell battery according to the invention, in cross section;

FIGS. 2a and 2b show the embodiment of the fuel cell battery according to FIG. 1 both in cross section;

DESCRIPTION OF THE PREFERRED EMBODIMENTS

Figure 4:
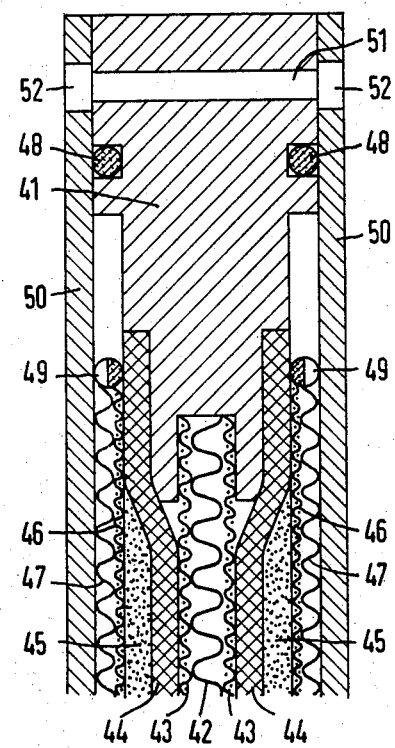
FIG. 4 shows a cross section through the cell frame of the individual cell according to FIG. 1.

FIG. 1 shows in cross section an individual cell of an embodiment of the fuel cell battery according to the invention. This battery is designed as an $H_2/O_2$ fuel cell battery. The individual fuel cells of this battery are constructed in the manner shown in FIG. 4, which shows the cross section IV—IV through the cell frame of the individual cell according to FIG. 1. In a frame 41 of plastic material, for example of methacrylic acid ethyl ester, such as Plexiglass, which is about 4.1 mm. thick, are arranged the gas chambers and the electrolyte chambers. The frame may, for example, be 255 mm. high and 220 mm. wide. The electrolyte chamber is filled with one or several nickel screens 42, 43, which at the same time serve as spacers. Cover layers 44 in the form of asbestos diaphragms are arranged on both sides of the electrolyte chamber. Adjacent to the cover layers 44 are electrodes 45, preferably made of catalytic material in powder form, which may advantageously contain a binding agent whereby the particles of the catalyst are bonded to each other as well as to the cover layer 44. These electrode layers are followed by at least one nickel screen 46, 47 each, whereby the gas chambers are formed. Electrochemical cells of such design are described in U.S. Pats. 3,471,336; 3,480,538 and 3,554,812.

The details of the fuel cells mentioned are all accommodated in the cell frame 41 (of about 4.1 mm. thickness). The design of the fuel cell may be somewhat asymmetrical. For example, the cathode may be thinner than the anode. In the area of the cell frame 41 the gas chambers are sealed against the outside and toward the electrolyte chamber by means of seals in the form of O-rings 48 and 49. The seals 49 are slotted in order to allow the reaction gases to pass to the corresponding gas chambers. On both sides of the cell frame 41, nickel sheets 50 are arranged as the closing members, and thus follow the gas chambers. Nickel sheets 50 may be of about 0.3 mm. thickness and serve as gas separator walls between the individual cells as well as for establishing contact. As the nickel sheets 50 must in each case be shared by two individual cells, a thickness of about 4.4 mm. is obtained for each individual cell. Several of these fuel cells are combined to form a battery, with end plates made, for example, of Plexiglas, closing off the battery. The end plates, not shown, are pressed together by means of bolts, not shown, holes 51 and 52, respectively, in the cell frame 41 and the nickel sheets 50 serve for receiving the bolts.

In FIG. 1, the cell frame is designated by numeral 1. The external shape of the cell frame 1 is octogonal and the free space 2 inside the cell frame 1 is of circular cross section. An active surface of about 285 cm.$^2$ is thereby obtained for the electrodes. Numerals 3 and 5 designate the supply ducts for the gaseous reactants, and numerals 4 and 6 indicate the discharge ducts. Supply ducts 3, 5 and discharge ducts 4, 6, respectively, are connected with the corresponding gas chambers in the individual cells, for example, by branch canals which are not shown in the figure. The anode or hydrogen electrodes and the associates gas chambers, respectively, are supplied with hydrogen ($H_2$), through the duct 3, and the cathode or oxygen electrodes and the associated gas chambers, respectively, are supplied with oxygen ($O_2$) through the duct 5. The gaseous reactants are discharged through the duct 4 (for $H_2$) and duct 6 (for $O_2$), respectively, with each discharge duct 4 and 6 being respectively diagonally opposite the ducts 3 and 5. Thus, the reaction gases flow through the gas chambers from the top to the bottom. Holes 7 in the cell frame 1 serve for pressing the battery together by means of bolts, not shown.

In the upper region of the cell frame, i.e., in the region of the upper boundary of the free spaces 2, are arranged the electrolyte distributor 8 and the electrolyte manifold 10. The electrolyte distributor 8 serves at the same time as the main supply duct for the electrolytic liquid within the fuel cell battery. Canals or ducts 9 and 11 connect the main electrolyte ducts 8 and 10, respectively, with the electrolyte chamber of each individual fuel cell of the battery. The ducts 9 serve as the electrolyte supply ducts and the ducts 11 serve as the electrolyte discharge ducts. The electrolyte manifold 10 may advantageously have a larger diameter than the electrolyte distributor 8. A good and unimpeded runoff of the electrolytic liquid can thereby be achieved. The electrolyte distributor 8 may, for example, have a diameter of 6 mm. and the electrolyte manifold 10 may have a diameter of about 19 mm.

Through the arrangement of the main electrolyte ducts wherein the electrolyte interrupter system consists of the electrolyte distributor 8 and the electrolyte manifold 10 in the upper region of the cell frame and, therefore, of the fuel cell battery, the feeding in of the electrolyte to the electrolyte chambers as well as the discharge of the electrolyte from the electrolyte chambers takes place in the upper regions. This arrangement is in contrast to the batteries now known, such as that disclosed in U.S. Pat. 3,524,769. In the known batteries, the electrolytic liquid is fed into the electrolyte chambers from below and is discharged again from the top.

As mentioned previously, the electrolyte distributor 8 can advantageously be arranged in a fuel cell battery according to the invention at a higher level than the electrolyte manifold 10. The arrangement at different heights in this fashion provides the result that, after the electrolyte circulation is terminated, i.e., after the completion of the flushing phase, a liquid level adjusts itself in the electrolyte supply duct 9 which lies between the opening 12 of such duct 9 into the electrolyte distributor 8 and the opening 13 of duct 9 into the corresponding electrolyte chamber. This level is predetermined by the height of the opening 14 of the electrolyte discharge duct 11 into the electrolyte manifold 10, since the electrolyte manifold 10 is free of electrolytic liquid during the rest period in order to avoid electrolyte leakage currents, while the electrolyte discharge ducts 11 are filled with electrolytic liquid. The electrolyte distributor 8 with the electrolyte supply duct 9, and the electrolyte manifold 10 with the electrolyte discharge duct 11, are preferably arranged so that the liquid level adjusts itself in the electrolyte supply duct 9 between the opening 12, namely, the point where it opens into the electrolyte distributor, and an area 15 which is situated approximately at the same height as the uppermost liquid level in the electrolyte chambers.

The liquid level in the duct 9 should be above the opening 13, as the electrolyte chambers are to be filled completely with liquid. If the liquid level should drop below the level of the opening 13, it wouuld be possible that air could enter from the electrolyte supply tank into the electrolyte chambers. More particularly, if there is a bypass line for equalizing the pressure between the electrolyte distributor 8 and the electrolyte manifold 10, the danger exists wherein the air would than get from the electrolyte supply tank into the electrolyte chambers via the main electrolyte discharge duct, the bypass, the main electrolyte supply duct and the electrolyte supply ducts. The air can be reliably prevented from entering into the electrolyte chambers if the liquid surface in the electrolyte supply ducts 9 is at a level which is above the area 15. The upper limit for the level of the liquid surface in the electrolyte supply duct 9 is given. The liquid level in the duct 9 extends during the rest period, i.e., during that time when no electrolyte flushing takes place, at the most up to the opening 12, whereby the electrolyte distributor 8 is free of liquid in order to interrupt the electrolyte short-circuit currents.

According to one example, a batteery was assembled with 39 working cells of the kind described and an indicator cell for the inert-gas flushing. To compensate for the different thermal expansion of the plastic frames and the steel bolts for holding the battery together, cup springs were used. The completed battery was mounted on a slide drawer, so that it would be removed from the overall system at any time without much effort. The electric contacts could be easily opened by means of a plug-in connection. Also, the connections for the electrolytic liquid and the reaction gases were separated by means of snap-on fixtures.

The battery delivers, for example, a power of 100 watts, with a minimum voltage of 24 volts. In connection with the electrolyte temperature, the battery operates satisfactorily at a temperature range of from $-20°$ C. to $+60°$ C. The battery is operated with hydrogen and oxygen as reactants at an operating pressure of about 0.14 $N/mm.^2$, or approximately 1.4 $kg./cm.^2$, and with the aqueous potassium hydroxide solution as the electrolytic liquid. The anode material comprises Raney nickel in powder form with a coating of about 200 $mg./cm.^2$. The cathode material comprises Raney silver in powder form with a coating of about 100 $mg./cm.^2$.

Since the lowest operating temperature does not fall below $-20°$ C., potassium hydroxide with a range of concentrations of 4 to 14 mol/liter can be used. For starting the battery, 12 m. KOH can be used as the electrolytic liquid, the electrolyte supply tank being about one-third full. At the end of the operating phase, the electrolyte supply tank is then filled with 4 m. KOH. Two-thirds of the tank capacity is therefore available for the collection of the reaction water which is formed in the electrochemical reaction.

With a continuous load of 100 w., about 1.15 liters of water is produced per day. If the electrolyte supply tank has a capacity of 100 liters, the period without attendance would be about 58 days. However, in television channel translators with an automatic transmission pause device, the full power is required only for 17 hours, while during the transmission pause (about 7 hours per day), lower power, such as 12 watts is required. In that case about 0.86 liter of $H_2O$ are formed per day, so that an attendance-free period of 77 days is obtained. The attendance-free period of the battery is not limited by the dilution of the electrolyte due to the reaction water formed and the increase of the volume of the electrolytic liquid, respectively, since the fuel cell battery according to the present invention can be equipped with an additional device for removing the reaction water. Such a device is described, in the Austrian Pat. 277,341. In this manner, it can be assured that the concentration of the electrolyte is held constant, such as at about 6 mol/liter.

The closed electrolyte cycle consists of an electrolyte supply tank, a pump and the fuel cell battery. For determining the concentration, a hydrometer can be arranged in the electrolyte cycle, the scale of which directly indicates the KOH concentration in mol/liter. If required, a filter may also be provided in the closed electrolyte cycle. A pump driven by a DC split-housing motor can be employed for circulating the electrolytic liquid. Such a pump is described in "Siemens Zeitschrift," XXXXIV, No. 6, p. 392 to 395 (1970). The pump described therein is highly reliable and has a long service life.

The electrolyte is circulated intermittently, with a rest period of 5 hours and a flushing phase of 3 minutes. In this manner, the leakage losses due to the electrolyte short-circuit current can be kept very low. The operation of the intermittent electrolyte flushing will be briefly explained as follows. During the initial pumping, the electrolytic liquid proceeds from the main supply duct 8 into the electrolyte supply ducts 9 and from there into the electrolyte chambers of the fuel cells. If the liquid level has reached the main discharge duct 10 via the electrolyte discharge ducts 11, the former is filled and the electrolytic liquid returns subsequently to the electrolyte supply tank. Air cushions which have formed in the upper part of the electrolyte chambers can also be removed through the electrolyte circulation. During the entire duration of the flushing operation, an electrolyte short-circuit current flows via the electrolyte ducts.

If the circulation of the electrolyte is not terminated, the electrolytic liquid runs off via the electrolyte manifold 10 until the liquid level has fallen to the height of the openings of the electrolyte discharge ducts leading into the electrolyte manifold. In this condition, there is no longer an electrolyte connection between the individual fuel cells. A slight film of electrolyte may, however, remain on the plastic material. A weak leakage current caused thereby can advantageously be eliminated by making the electrolyte ducts hydrophobic. This procedure is recommended particularly for batteries of low power, such as 25 watts, where the leakage current is relatively more important. It is noted that at least the electrolyte distributor and electrolyte manifold, i.e., those parts of the main electrolyte ducts which are located within the battery, should be made hydrophobic. However, the electrolyte supply ducts and the electrolyte discharge ducts can also be made hydrophobic. Hydrophobic treatment is achieved with water-repellent substances such as polytetrafluorethylene (Teflon) or polyethylene. For this purpose, a procedure of spraying the respective electrolyte ducts with a Teflon dispersion can be employed.

Complete runoff of the electrolytic liquid can also be achieved by providing that the electrolyte discharge ducts 11 open into the electrolyte manifold 10 at a level which is situated above the bottom of the hole that forms the electrolyte manifold.

In the fuel cell battery the electrolyte short-circuit current can be reduced considerably by the above-described arrangement of the electrolyte interruption system. While, during the pumping period, the hydrogen consumption for the leakage current is, for example, 11.3 liters/hour under normal conditions, it is, during the rest condition only about 1.5 liters/hours, under normal conditions, i.e., at a temperature of 0° C. and a pressure of 760 torr, corresponding to approximately $10^5$ newtons per m.$^2$.

FIGS. 2a and 2b show the cross sections IIA and IIB, respectively, through the FIG. 1 embodiment of the fuel cell battery according to the invention. More particularly, FIGS. 2a and 2b illustrate an advantageous arrangement of the electrolyte interruption system in which the electrolyte manifold, and optionally also the electrolyte distributor, can be inclined with respect to the longitudinal axis of the battery. Through the inclination of the electrolyte manifold, troublefree runoff of the electrolytic liquid can be assured after the flushing phase is terminated.

In the fuel cell battery 20 shown in FIGS. 2a and 2b, end plates 21 and 22 are provided for closing off the battery. The battery consists of several fuel cells 23 which are arranged in plastic frames 24. The individual cells are separated from each other by nickel sheets 25. In the FIGS. 2a and 2b, the known details of the fuel cells such as electrodes, diaphragms, gas chambers and electrolyte chamber are not shown. The supply and the discharge of the electrolytic liquid takes place at different ends of the battery. The inlet 26 for the feeding in of the electrolyte is in the end plate 22, and the outlet 27 for the discharge of the electrolyte is in the end plate 21.

For a comparison of FIGS. 2a and 2b which represent partial cross sections through the same battery, it can be seen that in the fuel cell battery 20 according to the invention, the electrolyte distributor 28 is arranged at a higher level than the electrolyte manifold 29.

FIG. 2b shows the cross section IIB through the battery according to FIG. 1 at a location where the electrolyte discharge ducts have been placed in the sectional plane for the sake of clarity. Here, it can be seen that the electrolyte manifold 29 is inclined against the longitudinal axis of the fuel cell battery 20. It can further be seen from the FIG. 2b that the openings 32 of the electrolyte discharge canals or ducts 31 into the electrolyte manifold 29 are at a level which is situated above the bottom 33 of the hole that constitutes the electrolyte manifold. It is to be understood that, as used herein, the term "bottom" is intended to mean the lowest point of a respective hole in a cell frame.

In FIG. 2a, there is illustrated the arrangement wherein the electrolyte distributor 28 is inclined against the longitudinal axis of the battery. The electrolyte supply canals or ducts 30 open into the electrolyte distributor 28 at the bottom of the hole that forms the electrolyte distributor.

The inclination of the electrolyte manifold and, if applicable, also of the electrolyte distributor, provides assurance of a troublefree and complete runoff of the electrolytic liquid. For batteries consisting of a large number of fuel cells, it is also advantageous if the electrolyte manifold 29 as well as the electrolyte distributor 28 are inclined against the longitudinal axis of the battery, as this will assure in a simple manner that the liquid level adjusts itself in all electrolyte supply ducts to the desired level.

It is noted, however, that trouble-free and complete run-off of the electrolytic liquid from the electrolyte interruption system can be achieved by also providing that the entire interruption system is inclined. This can be achieved by mounting the fuel cell battery with an incline in the direction of its longitudinal axis. The inclined installation of the battery is advantageous in comparison with the embodiment having the main electrolyte ducts inclined against the longitudinal axis, particularly in the case of batteries having many cells, wherein the technical cost with the inclined arrangement of the main electrolyte ducts can be considerable.

In a battery comprised of 40 cells and having, for example, a longitudinal axis of about 20 cm. long, a vertical drop of between 4 and 12 mm. over the entire length of the battery has been found advantageous for the inclined installation. Preferably, such a battery has an inclination of about 8 mm. over the entire 20 cm. length. This means that the inclination is relatively small, being generally in the range between 2 and 6%, and particularly about 4%.

It is furthermore advantageous to provide in the fuel cell battery according to the invention a bypass line between the electrolyte distributor and the electrolyte manifold. This bypass line provides a pressure equalization between the electrolyte distributor and the electrolyte manifold. With such bypass line, the electrolytic liquid adjusts itself quickly and simply to the same level in the electrolyte supply and discharge ducts after the flushing phase is terminated.

The bypass line from the electrolyte distributor or the main electrolyte supply duct to the electrolyte manifold or the main electrolyte discharge duct is arranged at an end face of the battery, which results in a short run for the line. Referring again to the FIGS. 2a and 2b there is shown how a bypass line 34 connects the electrolyte distributor 28 with the electrolyte manifold 29 for the purpose of pressure equalization. The bypass line 34 is arranged at least in part in the end plate 22, and such line 34 branches off from the electrolyte distributor 28. Also, the bypass line 34 bridges, at the part outside of the battery, the distance between the electrolyte distributor 28 and the electrolyte manifold 29 and open at a recess 35 in the end plate 22 into the electrolyte manifold 29.

Figure 3:
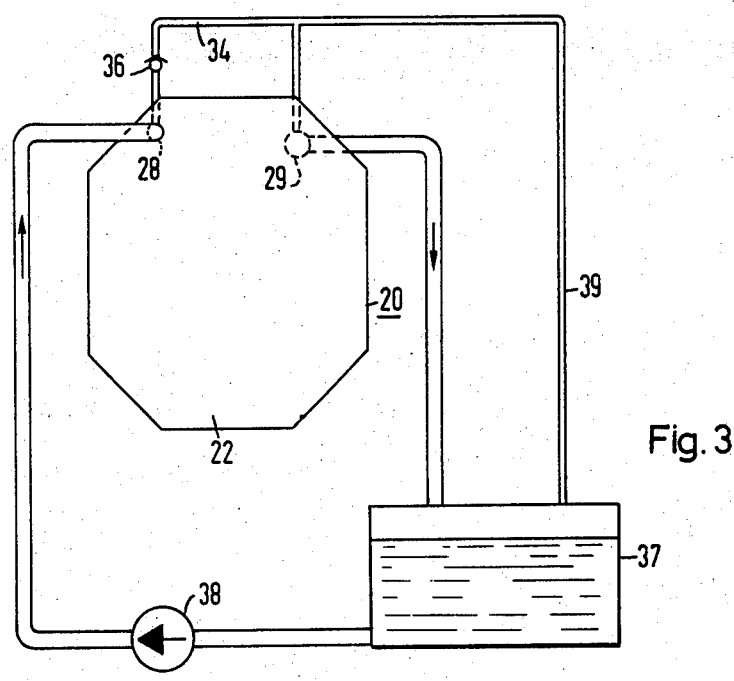
FIG. 3 shows a system in which a fuel cell battery in accordance with the invention, an electrolyte supply tank and an electrolyte pump are arranged in a closed electrolyte cycle.

Referring to FIG. 3 there is shown a system consisting of a fuel cell battery 20 according to the invention, an electrolyte supply tank 37, and an electrolyte pump 38, arrange in a closed electrolyte cycle. Also, the above-mentioned bypass line is also designated by numeral 34. It will be seen clearly from FIG. 3 that the bypass line 34, which is arranged at least in part in the end plate 22, bridges only a short distance.

It is noted that, with respect to the FIGS. 2a, 2b, and 3, corresponding parts are labelled with the same reference numbers.

A float valve 36 can advantageously be arranged in the bypass line 34 between the electrolyte distributor 28 and the electrolyte manifold 29. Float valve 36 prevents the electrolytic liquid from passing from the electrolyte distributor 28 through the bypass 34 to the electrolyte manifold 29. The float valve 36 is designed as a check valve for the liquid, but it makes pressure equalization for gases possible. The float valve 36 is advantageous since, during the circulation of the electrolyte, a higher pressure prevails in the main electrolyte supply duct or in the electrolyte distributor than in the main electrolyte discharge duct or the electrolyte manifold.

In the fuel cell battery according to the invention, the bypass line 34 between the electrolyte distributor 28 and the electrolyte manifold 29 can further advantageously be connected via an additional line 39 with the electrolyte supply tank 37. The line 39 serves to assure complete pressure equalization between the electrolyte distributor 28 and the electrolyte manifold 29. The line 39 preferably opens into the bypass 34, between the float valve 36 and the electrolyte manifold 29. The opening of the line 39 into the bypass 34 is preferably at the highest point of the bypass line 34.

It would also be sufficient for assuring complete pressure equalization alone if, for instance, the bypass line 34 is connected via an opening with the atmosphere for pressure equalization. This, however, would result in the disadvantage that the potassium hydroxide solution, which is used as the electrolytic liquid in an $H_2/O_2$ fuel cell battery, would be carbonated by the carbon dioxide content of the air. In order to avoid this danger, the access of $CO_2$ must be prevented. Particularly for fuel cell batteries which must operate unattended for extended periods of time, this is accomplished in the manner described above, wherein the bypass 34 is connected by an additional ine with the electrolyte supply tank.

Although the above description is directed to the preferred embodiments of the invention, it is noted that other variations and modifications will be apparent to those skilled in the art and, therefore, may be made without departing from the spirit and scope of the present invention.

What is claimed is:

1. An electrolyte interrupter system providing intermittent flushing of the electrolyte in a fuel cell battery having several fuel cells in which the electrodes are held in plastic frames, comprising:
an electrolyte distributor and an electrolyte manifold constituting said electrolyte interruptor system and arranged in said frames of the individual fuel cells;
electrolyte supply ducts for the individual fuel cells opening into said electrolyte distributor;
electrolyte discharge ducts for the individual fuel cells opening into said electrolyte manifold; and
said electrolyte distributor and said electrolyte manifold each being formed by mutually aligned holes in the upper portion of said frames, with the bottom of the holes forming the electrolyte distributor being located at least at the same height as the openings of said electrolyte discharge ducts into said electrolyte manifold;
said electrolyte distributor, said electrolyte distributor supply ducts, said electrolyte manifold, and said electrolyte manifold discharge ducts being so constructed and arranged that: (a) said electrolyte manifold is free of electrolyte; (b) said electrolyte discharge ducts are filled with electrolyte; and (c) the electrolyte levels in said supply ducts are above the openings of said supply ducts into the electrolyte chambers of said fuel cell battery; after the completion of the flushing process to avoid electrical current leakage.

2. System as recited in claim 1, wherein said electrolyte distributor is arranged at a higher level than said electrolyte manifold.

3. System as recited in claim 2, wherein said electrolyte discharge ducts open into said electrolyte manifold at a level which lies above the bottom of the hole forming said electrolyte manifold.

4. System as recited in claim 1, wherein said electrolyte discharge ducts open into said electrolyte manifold at a level which lies above the bottom of the hole forming said electrolyte manifold.

5. System as recited in claim 1, wherein said electrolyte manifold is inclined against the longitudinal axis of the battery.

6. System as recited in claim 5, wherein both said electrolyte manifold and said electrolyte distributor are inclined against the longitudinal axis of the battery.

7. System as recited in claim 2, wherein said electrolyte manifold is inclined against the longitudinal axis of the battery.

8. System as recited in claim 7, wherein both said electrolyte manifold and said electrolyte distributor are inclined against the longitudinal axis of the battery.

9. System as recited in claim 1, wherein said electrolyte interrupter system is inclined together with said fuel cell battery against the horizontal.

10. System as recited in claim 2, wherein said electrolyte interrupter system is inclined together with said fuel cell battery against the horizontal.

11. System as recited in claim 4, wherein said electrolyte interrupter system is included together with said fuel cell battery against the horizontal.

12. System as recited in claim 1, wherein said electrolyte distributor and said electrolyte manifold are made hydrophobic.

13. System as recited in claim 1, further comprising a bypass line extending between said electrolyte distributor and said electrolyte manifold.

14. System as recited in claim 13, further comprising a float valve arranged in said bypass line between said electrolyte distributor and said electrolyte manifold.

15. System as recited in claim 14, further comprising an additional line for connecting said bypass line with an electrolyte supply tank.

16. System as recited in claim 13, further comprising an additional line with an electrolyte supply tank.

References Cited
UNITED STATES PATENTS

| | | | |
|---|---|---|---|
| 3,522,098 | 7/1970 | Sturm et al. | 136—86 R |
| 3,524,769 | 8/1970 | Sturm et al. | 136—86 C |
| 3,573,102 | 3/1971 | Lane et al. | 136—86 R |
| 3,281,275 | 10/1966 | Levine et al. | 136—86 D |
| 3,457,114 | 7/1969 | Wedin | 136—86 R |

ALLEN B. CURTIS, Primary Examiner

T. A. WALTZ, Assistant Examiner

U.S. Cl. X.R.

136—162; 204—275